(12) United States Patent
Kruglick

(10) Patent No.: US 9,396,069 B2
(45) Date of Patent: Jul. 19, 2016

(54) COST REDUCTION FOR SERVICING A CLIENT THROUGH EXCESS NETWORK PERFORMANCE

(75) Inventor: Ezekiel Kruglick, Poway, CA (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 0 days.

(21) Appl. No.: 14/001,870

(22) PCT Filed: Sep. 6, 2012

(86) PCT No.: PCT/US2012/054030
§ 371 (c)(1),
(2), (4) Date: Aug. 29, 2014

(87) PCT Pub. No.: WO2014/039046
PCT Pub. Date: Mar. 13, 2014

(65) Prior Publication Data
US 2015/0088816 A1   Mar. 26, 2015

(51) Int. Cl.
| | | |
|---|---|---|
| *G06F 17/30* | (2006.01) | |
| *G06F 11/14* | (2006.01) | |
| *H04L 12/811* | (2013.01) | |
| *H04L 12/24* | (2006.01) | |
| *G06Q 10/06* | (2012.01) | |
| *H04L 12/803* | (2013.01) | |
| *H04L 12/841* | (2013.01) | |

(52) U.S. Cl.
CPC ........ *G06F 11/1402* (2013.01); *G06F 11/1453* (2013.01); *G06F 17/30153* (2013.01); *G06Q 10/06312* (2013.01); *H04L 41/0896* (2013.01); *H04L 47/125* (2013.01); *H04L 47/283* (2013.01); *H04L 47/38* (2013.01)

(58) Field of Classification Search
CPC .................... G06F 17/30097; G06F 17/30159; G06F 17/30348
USPC ......................................................... 707/610
See application file for complete search history.

(56) References Cited

U.S. PATENT DOCUMENTS 8,122,538 B2 * 2/2012 McBrearty ............. A47G 9/062
                                                  297/219.1
8,205,065 B2 * 6/2012 Matze ................... G06F 3/0608
                                                  711/112

(Continued)

FOREIGN PATENT DOCUMENTS

WO       2011133440 A1    10/2011

OTHER PUBLICATIONS

"Data deduplication," Wikipedia page, Apr. 12, 2012, accessed at http://web.archive.org/web/20120523120829/http://en.wikipedia.org/wiki/Data_deduplication, last modified on Apr. 12, 2012, 6 pages.
"IP Flow Information Export (ipfix): Description of Working Group," Apr. 2013, Accessed at http://web.archive.org/web/20120829181134/http://datatracker.ietf.org/wg/ipfix/charter/, Accessed on Mar. 16, 2015, pp. 3.
"The Riverbed Story" Sep. 5, 2012 accessed at: http://web.archive.org/web/20120905151701/http://www.riverbed.com/us/company/riverbed_story/ accessed on Mar. 16, 2015, 9 pages.
Benson et al., "Network traffic characteristics of data centers in the wild," in Proceedings of the 10th annual conference on Internet measurement, pp. 267-280 (Nov. 2010).

(Continued)

*Primary Examiner* — Jean M Corrielus
(74) *Attorney, Agent, or Firm* — Turk IP Law, LLC

(57) ABSTRACT

Technologies are presented for reducing the network delivery speed of a datacenter deployment within a controlled performance definition while also reducing the overall bandwidth demand on core servers in the datacenter. In some examples, a throttle may be used adjusting (e.g., slowing) data flow that is informed of both network performance and total allowable delay, and a compression/deduplication process. The compression/deduplication process may reduce amounts of stored data by compressing stored data or removing duplicate data and may be a transportable infrastructure process. The compression/deduplication process may also be hardware-assisted with network processors in the datacenter.

17 Claims, 7 Drawing Sheets

(56) References Cited

U.S. PATENT DOCUMENTS

| | | | | |
|---|---|---|---|---|
| 8,341,255 | B2* | 12/2012 | Gopalakrishnan | H04L 65/4084 709/200 |
| 8,392,838 | B2* | 3/2013 | Chawla | G06F 9/4445 715/738 |
| 8,407,366 | B2* | 3/2013 | Alkhatib | H04L 12/4641 709/238 |
| 8,739,172 | B2* | 5/2014 | Prakash S M | G06F 9/45558 705/7.12 |
| 9,141,625 | B1* | 9/2015 | Thornewell | G06F 17/30079 |
| 9,213,844 | B2* | 12/2015 | Kruglick | G06F 21/60 |
| 2006/0253633 | A1 | 11/2006 | Brundridge et al. | |
| 2009/0064288 | A1* | 3/2009 | Bagepalli | H04L 63/166 726/4 |
| 2009/0268903 | A1* | 10/2009 | Bojinov | G06F 3/0622 380/45 |
| 2009/0319681 | A1 | 12/2009 | Freelander et al. | |
| 2010/0250896 | A1* | 9/2010 | Matze | G06F 3/0608 711/216 |
| 2011/0082924 | A1* | 4/2011 | Gopalakrishnan | H04L 65/4084 709/223 |
| 2011/0110377 | A1* | 5/2011 | Alkhatib | H04L 29/12349 370/395.53 |
| 2011/0209147 | A1* | 8/2011 | Box | G06F 9/5077 718/1 |
| 2011/0209156 | A1* | 8/2011 | Box | G06F 9/5077 718/104 |
| 2011/0246741 | A1* | 10/2011 | Raymond | G06F 17/30159 711/170 |
| 2012/0317249 | A1* | 12/2012 | Salsburg | G06F 9/5072 709/220 |
| 2013/0024494 | A1* | 1/2013 | Guarrieri | G06F 9/5061 709/203 |
| 2013/0054545 | A1* | 2/2013 | Anglin | G06F 17/3015 707/693 |
| 2013/0080728 | A1* | 3/2013 | Cashman | G06F 3/0608 711/170 |
| 2013/0151484 | A1* | 6/2013 | Kruglick | G06F 17/30002 707/692 |

OTHER PUBLICATIONS

Connor, D., "Deduplication: Stop repeating yourself," Network World, accessed at.http://web.archive.org/web/20120207134028/http://www.networkworld.com/news/2006/091806-storage-deduplication.html, 2 pages, (Sep. 18, 2006).

Geer, D., "Reducing the Storage Burden via Data Deduplication," Computer, vol. 41, No. 12, pp. 15-17 (Dec. 2008).

Kandula, S. et al. "The Nature of Datacenter Traffic: Measurements & Analysis," Proceedings of the 9th ACM SIGCOMM conference on Internet measurement conference, pp. 202-208 (Nov. 2009).

Lillibridge, M. et al., "Sparse Indexing: Large Scale, Inline Deduplication Using Sampling and Locality," Proceedings of 7th USENIX Conference on File and Storage Technologies, pp. 111-123 (Feb. 2009).

Mearian L., "World's servers process 9.57ZB of data a year," accessed at: http://www.computerworld.com/article/2508689/data-center/world-s-servers-process-9-57zb-of-data-a-year.html, 3 pages (May 9, 2011).

Short, J. E. et al. "How Much Information? 2010 Report on Enterprise Server Information," accessed at: http://hmi.ucsd.edu/pdf/HMI_2010_EnterpriseReport_Jan_2011.pdf, 38 pages (Jan. 2011).

Wiseman, C. et al., "A Remotely Accessible Network Processor-Based Router for Network Experimentation", Proceedings of the 4th ACM/IEEE Symposium on Architectures for Networking and Communications Systems, pp. 20-29 (Nov. 2008).

"EventTracing for Windows", http://msdn.microso.com/en-us/library/ms751538.aspx.

"Google app engine", http://code.google.com/appengine/.

"Windows Azure"; http://www.microso.com/azure/, Microsoft's Cloud Platform, retrieved Jul. 31, 2013.

Soule et al., "Traffic Matrices: Balancing Measurements,Inference and Modeling", SIGMETRICS, Jun. 6-10, 2005.

Gunnar et al., "Traffic Matrix Estimation on a Large IP Backbone—A Comparison on Real Data", IMC, Sicily, Italy. Oct. 25-27, 2004.

Cranor et al., "Gigascope: A Stream Database for Network Applications", SIGMOD, San Diego, CA, Jun. 9-12, 2003.

Estan et al., "Building a Better NetFlow", SIGCOMM, Portland, OR, Aug. 30-Sep. 3, 2004.

Olston et al., "Pig Latin: A Not-So-Foreign Language for Data Processing", SIGMOD, Vancouver, BC, Canada, Jun. 9-12, 2008.

Cisco Nexus 7000 Series Switches, Cisco Systems, http://www.cisco.com/en/US/products/ps9402/, retrieved on Jul. 31, 2013.

Chang et al., "Bigtable: A Distributed Storage System for Structured Data", ACM Trans. Comput. Syst. 26, 2, Article 4, 26 pages, Jun. 2008.

Ghemawat et al., "The Googie File System", SOSP, Bolton Landing, New York, USA, Oct. 19-22, 2003.

Gu et al, "Promote the Use of Explicit Delay Control", Journal of Communications, vol. 1, No. 3, Jun. 2006.

Hadoop distributed file system. http://hadoop.apache.org, Jul. 10, 2013.

Dean et al., "MapReduce: Simplified data processing on large clusters", Communications of the ACM, vol. 51, No. 1, pp. 107-113, Jan. 2008.

Greenberg et al, "VL2: A Scalable and Flexible Data Center Network", Communications of ACM, vol. 54, No. 3, Mar. 2011.

Barroso et al., "The Datacenter as a Computer: An Introduction to the Design of Warehouse-Scale Machines", Synthesis Lectures on Computer Architecture, May 2009.

Huang et al., "Communication-Efficient Online Detection of Network-Wide Anomalies", INFOCOM, pp. 134-142, May 2007.

Isard et al., "Dryad: Distributed Data-Parallel Programs from Sequential Building Blocks", EuroSys, Lisboa, Portugal, Mar. 21-23, 2007.

Metzler et al., "The 2012 Application & Service Delivery Handbook", Retrieved on Jul. 31, 2013.

Kodialam et al., "Effcient and Robust Routing of Highly Variable Traffic" Third Workshop on Hot Topics in Networks HotNets—III, San Diego, CA, USA, Nov. 15-16, 2004.

Duffield et al., "Estimating Row Distributions from Sampled Flow Statistics", SIGCOMM, Karlsruhe, Germany, Aug. 25-29, 2003.

Chaiken et al., "SCOPE: Easy and Efficient Parallel Processing of Massive Data Sets", VLDB, Auckland, New Zealand, Aug. 24-30, 2008.

Pang et al., "A First Look at Modern Enterprise Traffic", Internet Measurement Conference, Oct. 19-21, 2005.

Zhang-Shen et al., "Designing a Predictable Internet Backbone Network", IWQoS, pp, 178-192, Nov. 2005.

Kompella et al., "The Power of Slicing in Internet Flow Measurement" Intenet Measurment Conference Oct. 19-21, 2005.

Guha et al., "How Healthy are Today's Enterprise Networks?", IMC, Vouliagmeni, Greece, Oct. 20-22, 2008.

Kandula et al., "Dynamic Load Balancing Without Packet Reordering", ACM SIGCOMM Computer Communication Review vol. 37, No. 2, Apr. 2007.

Benson et al., "Understanding Data Center Traffic Characteristics", WREN, Barcelona, Spain, Aug. 21, 2009.

Karagiannis et al., "Network Exception Handlers: Host-network Control in Enterprise Networks", SIGCOMM, Seattle, WA, USA, Aug. 17-22, 2008.

Vasudevan et al., "Safe and Effective Fine-grained TCP Retransmissions for Datacenter Communication", SIGCOMM, Barcelona, Spain, Aug. 17-21, 2009.

Chen et al.,"Understanding TCP incast throughput Collapse in Datacenter Networks", WREN, Barcelona, Spain, Aug. 21, 2009.

Zhang et al., "Fast Accurate Computation of Large-Scale IP Traffic Matrices from Link Loads", SIGMETRICS, San Diego CA, USA, Jun. 10-14, 2003.

Zhang et al., "Network Anomography", IMC, Proceedings of the 5th ACM SIGCOMM, Oct. 19-21, 2005.

International Search Report and Written Opinion for PCT/US2012/054030, filed Sep. 6, 2012, mailed Jul. 8, 2013.

* cited by examiner

COST REDUCTION FOR SERVICING A CLIENT THROUGH EXCESS NETWORK PERFORMANCE

CROSS-REFERENCE TO RELATED APPLICATION

This Application is the National Stage filing under 35 U.S.C §371 of PCT Application Ser. No. PCT/US2012/054030 filed on Sep. 6, 2012. The PCT Application is herein incorporated by reference in its entirety.

BACKGROUND

Unless otherwise indicated herein, the materials described in this section are not prior art to the claims in this application and are not admitted to be prior art by inclusion in this section.

Datacenters that provide cloud services and clients of such datacenters may have one or more agreements (e.g., service-level agreements or SLAs) that specify minimum levels of service to be provided to the clients. When a client migrates a particular deployment from one datacenter (or multiple datacenters) to a new datacenter, the new datacenter may provide the same minimum level of service or performance that the client received at the original datacenter(s).

If the new datacenter is capable of providing performance exceeding the defined minimum level of performance, then it may be to the datacenter's benefit to provide performance up to the defined level, because the client is likely not valuing performance over the minimum. Moreover, the datacenter may then use the excess capability to service other, paying clients.

In the case of computational power, a processor with capabilities beyond what a customer defines may be reclaimed by the management of task virtualization. Once a computational level is determined to replicate client needs, the process may then be given less processor time, thereby reclaiming excess performance. A similar concept may apply to memory, where a virtual machine with relatively low memory demands may be co-located with other processes that may use excess memory.

SUMMARY

The present disclosure generally describes technologies for implementing cost reduction for servicing a client through excess network performance.

According to some example embodiments, a method for using excess network performance to reduce cost of servicing a client may include receiving a total allowable delay information associated with processing data at a datacenter based on a performance specification, determining a delay budget based on assessing the data to be processed based on the total allowable delay information, and performing a data reduction process on the data to be processed while slowing the processing of the data within the delay budget.

According to other example embodiments, a virtual machine manager (VMM) for using excess network performance to reduce cost of servicing a client may include a virtualized network connection configured to receive data to be processed from one or more virtual machines within the datacenter, a throttle module, and a data reduction module. The throttle module may be configured to receive a total allowable delay information associated with processing the data based on a performance specification and determine a delay budget based on assessing the data to be processed based on the total allowable delay information. The data reduction module may be configured to receive the data to be processed and the delay budget from the throttle module and reduce an amount of the data to be processed while slowing the processing of the data within the delay budget.

According to further example embodiments, a computer-readable storage medium may have instructions stored thereon for using excess network performance to reduce cost of servicing a client. The instructions may include receiving a total allowable delay information associated with processing data at a datacenter based on a performance specification, determining a delay budget based on assessing the data to be processed based on the total allowable delay information, and performing a data reduction process on the data to be processed while slowing the processing of the data within the delay budget.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
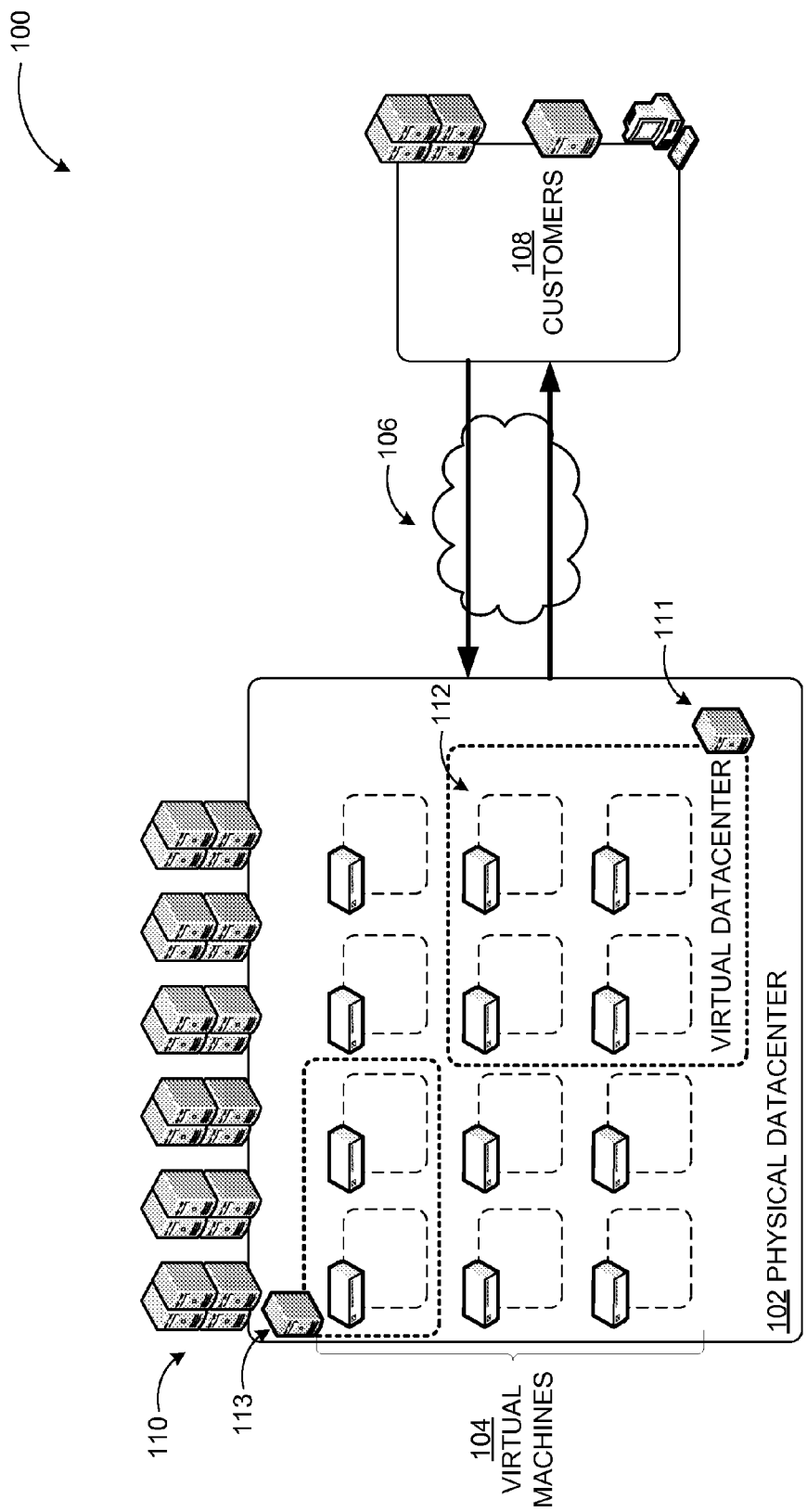
FIG. 1 illustrates an example datacenter, where cost reduction for servicing a client through excess network performance may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to providing cost reduction for servicing a client through excess network performance.

Briefly stated, technologies are presented for reducing the network delivery speed of a datacenter deployment within a controlled performance definition while also reducing the overall bandwidth demand on core servers in the datacenter. In some examples, a throttle may be used adjusting (e.g., slowing) data flow that is informed of both network performance and total allowable delay, and a compression/deduplication process. The compression/deduplication process may reduce amounts of stored data by compressing stored data or removing duplicate data and may be a transportable infrastructure process. The compression/deduplication process may also be hardware-assisted with network processors in the datacenter.

FIG. 1 illustrates an example system where cost reduction for servicing a client through excess network performance may be implemented, arranged in accordance with at least some embodiments described herein.

As shown in a diagram 100, a physical datacenter 102 may include one or more physical servers, such as, by way of example, physical servers 110, 111, and 113, each of which may be configured to provide one or more virtual machines 104. For example, the physical servers 111 and 113 may be configured to provide four virtual machines and two virtual machines, respectively. In some embodiments, one or more virtual machines may be combined into one or more virtual datacenters. For example, the four virtual machines provided by the physical server 111 may be combined into a virtual datacenter 112. The virtual machines 104 and/or the virtual datacenter 112 may be configured to provide cloud-related data/computing services such as various applications, data storage, data processing, or comparable ones to a group of customers 108, such as individual clients or enterprise customers, via a cloud 106.

Figure 2:
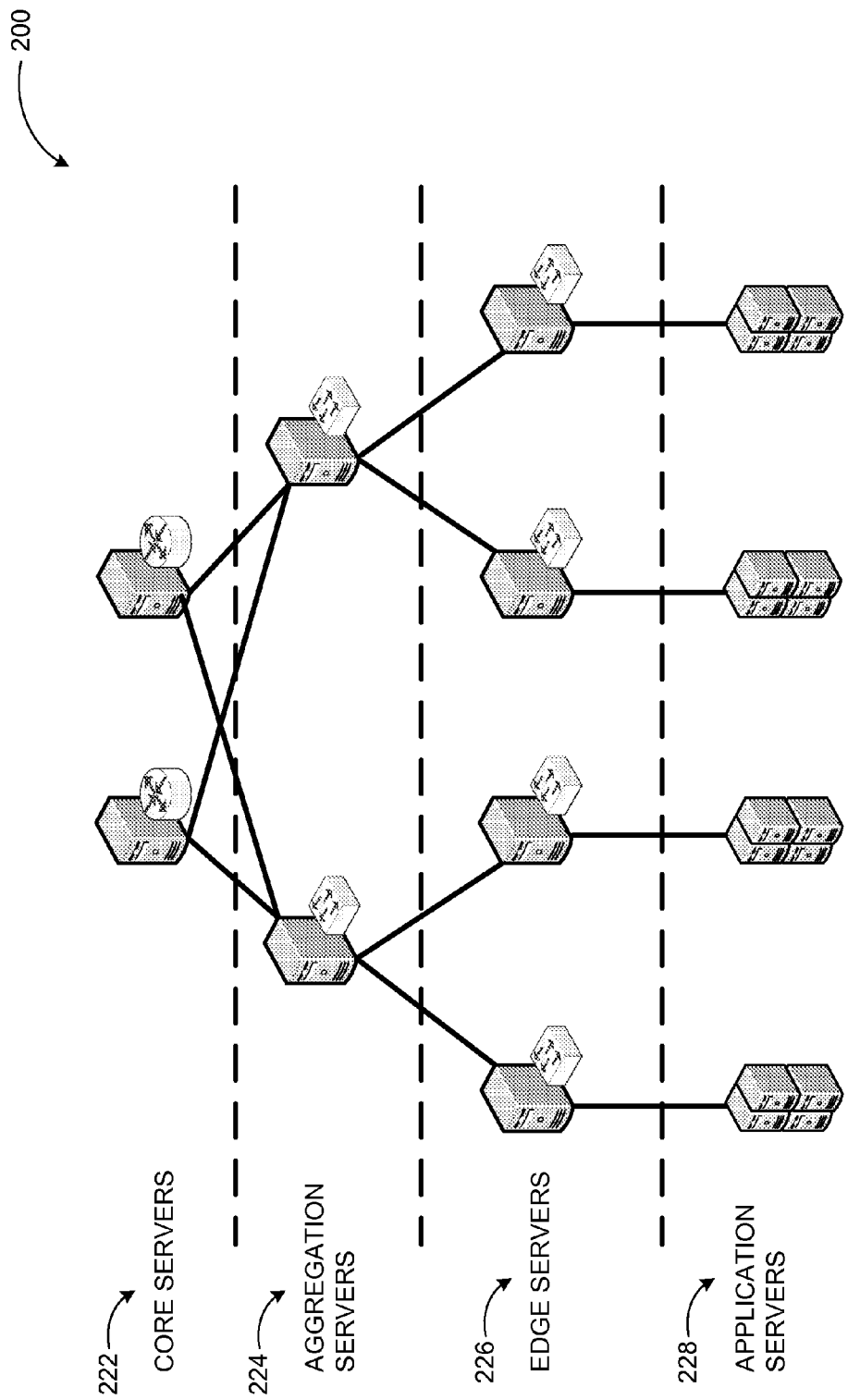
FIG. 2 illustrates a three layer network architecture where cost reduction for servicing a client through excess network performance may be implemented.

FIG. 2 illustrates a three layer network architecture where cost reduction for servicing a client through excess network performance may be implemented, arranged in accordance with at least some embodiments described herein.

As shown in a diagram 200, a datacenter (e.g., the physical datacenter 102 in FIG. 1) may include one or more layers of servers, which may be arranged in a hierarchical fashion. The datacenter shown in the diagram 200 has three layers, although in other embodiments a datacenter may have additional or fewer layers. The datacenter may include one or more application servers 228. In some embodiments, the application servers 228 may be configured to provide virtual machines (e.g., the virtual machines 104 described above in relation to FIG. 1) and/or run one or more customer applications. The datacenter may also include one or more edge servers 226 that reside in the first datacenter layer, each of which may couple to one or more of the application servers 228. The edge servers 226 in turn may couple to one or more aggregation servers 228, which may reside in a second layer of the datacenter. In some embodiments, each of the aggregation servers 228 may couple to two or more of the edge servers 226 and serve to combine or "aggregate" the network traffic from the connected edge servers. Finally, each of the aggregation servers 228 may couple to one or more core servers 222 in a third datacenter layer.

As described above, when a customer migrates a deployment from one or more origin datacenters to a new datacenter capable of providing performance exceeding the defined minimum level of performance necessary for the migrated deployment, it is to the new datacenter's benefit to provide performance up to the defined minimum level. Excess processing capability and/or memory may be reclaimed and used to service other clients. However, excess network performance may not be so easily reclaimed. For example, a datacenter with a very short network delivery delay may have paid to build such a high-performance network. However, excess network performance, in the context of replicating a customer experience at a former network, may not be reclaimed for other uses. If a customer is transferring from a facility with a slower network, their traffic may be given a lower priority, but may still consume the same bandwidth and achieve the same typical faster-than-necessary delivery speed as other customers on the fast network. For example, the delivery times within a datacenter may be less than 1 millisecond within a rack and 1-5 ms across many racks. If a datacenter is importing a customer who used to have a deployment spread across multiple datacenters, or within multiple separate colocation cells on a site, that deployment may have been operating with 30-100 ms of delay. In this specific example, moving the deployment to a single datacenter may provide a 6-20× increase in network speed. However, since the customer may be paying for a minimum network performance, and may not be willing to pay for higher performance, the datacenter may not be able to charge for the excess performance and therefore may find it difficult to recoup the cost of providing the excess performance.

Therefore, a datacenter built for high performance may be at a disadvantage when luring a customer from a facility with a slower network or from a distributed deployment, because the datacenter may be providing a higher price and higher performance network that may not provide enhanced value to the customer. As a result, datacenter providers may find it difficult to plan equipment purchases/upgrades, and in some situations a high performance facility may end up selling expensive network speed for lower prices.

One solution may be to use the excess network performance to reduce resource usage at a point where datacenter performance is limited. In some datacenters (such as the datacenter depicted in the diagram 200), different layers of the datacenter network may have different network traffic volumes. For example, in the datacenter shown in FIG. 2, the edge servers 226 and the aggregation servers 224 may have excess bandwidth, while the core servers 222 may suffer from congestion due to, for example, sheer data volume. Therefore, in some embodiments, excess network performance may be used to reduce the volume of data traveling through the core servers 222.

In some embodiments, a management system at the virtual machine manager level may use data deduplication or compression to reduce the overall volume of transmitted and/or stored data at the cost of slower overall delivery, while still meeting minimum performance definitions. As described above, a customer migrating a deployment to a new datacenter may have certain minimum performance definitions that the network performance of the new datacenter may exceed. For example, the minimum performance definitions may include a 30 ms data delivery time, whereas the new datacenter is capable of a 5 ms data delivery time. The 25 ms difference may then be used for data deduplication/compression, resulting in data delivery performance that meets the minimum performance definition of 30 ms, yet results in lower data volume to alleviate congestion (especially in the core server layer), which may provide datacenter-wide benefits.

Data deduplication processes may identify redundant data to avoid repeated transmitting or storing of duplicate data. In some embodiments, deduplication processes may use deduplication hashes. Deduplication hashes are compressed signatures that may be generated and used to detect storage blocks that contain the same data. Once such storage blocks are identified, in some embodiments they may be represented by references or links to the same data stored, for example, at local sources, instead of having to transmit and/or store multiple copies of the same data. By using deduplication techniques, the amount of data exchanged within a network may be reduced.

For example, data that is to be transmitted may be deduplicated both among itself and with a buffer of recently sent data. In some embodiments, deduplication signatures of any non-repetitive sections of the data (sections repetitive with the current or buffered data are already getting reduced by local deduplication) may be made and transmitted to a deduplication storage system local to the network destination for quick comparison with deduplication hashes at that end of the communication. Compression may also (or instead) be used to fit an available delay budget, including decompression time.

Figure 3:
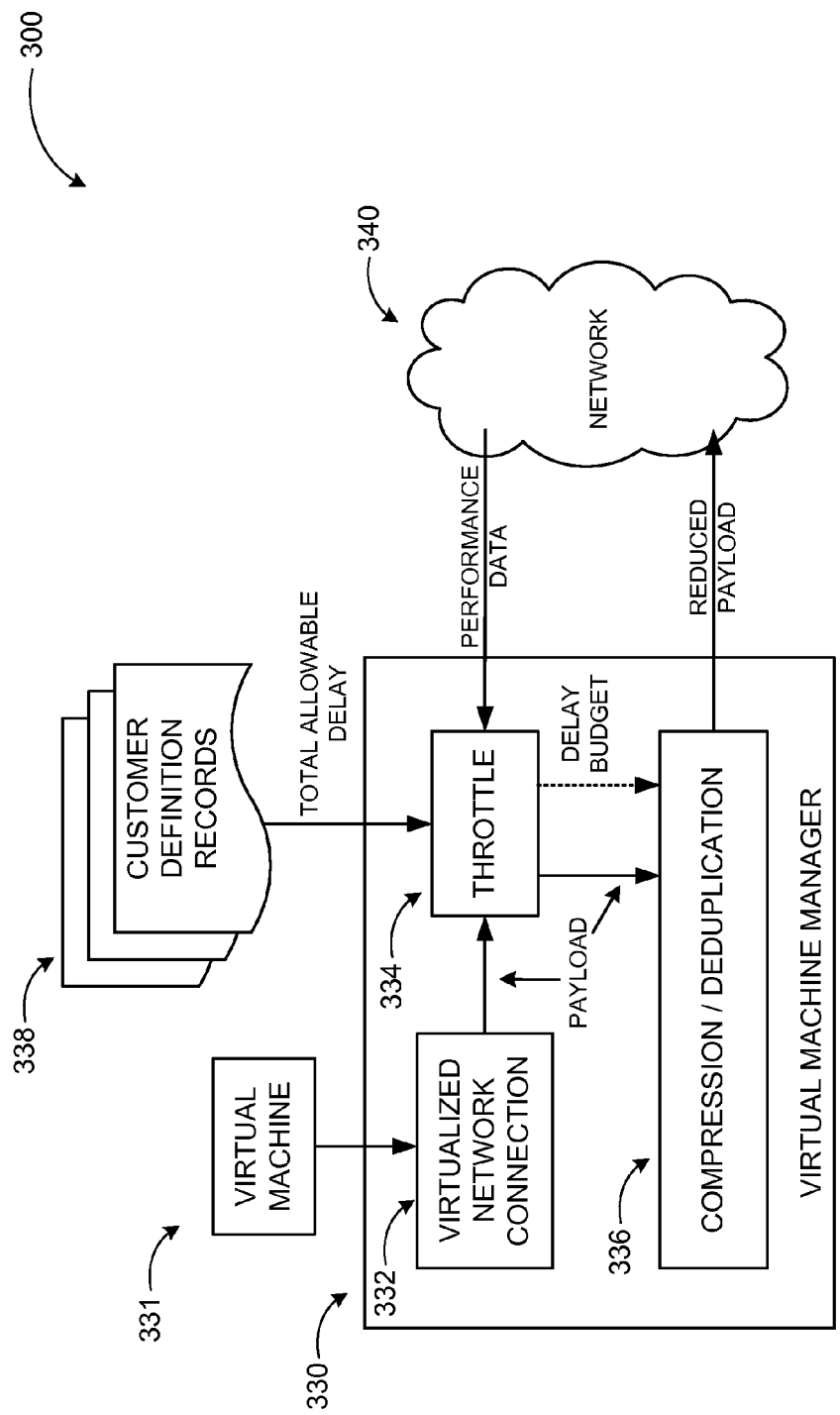
FIG. 3 illustrates a block diagram of an example system implementing servicing a client through excess network performance.

FIG. 3 illustrates a block diagram of an example system implementing servicing a client through excess network performance, arranged in accordance with at least some embodiments described herein.

As shown in a diagram 300, a virtual machine 331 (e.g., one of the virtual machines 104 described in FIG. 1) may transmit outgoing data through a virtual machine manager (VMM) 330. The VMM 330 may include a virtualized network connection 332 through which the outgoing data is received from the virtual machine 331. The VMM 330 may also include a throttle module 334 and a compression/deduplication module 336. The throttle module 334 may receive the outgoing data originating from the virtual machine 331 via the virtualized network connection 332. The throttle module 334 may also receive total allowable delay information from customer definition records 338 and performance data from a network 340. In some embodiments, the performance data may include network speed and/or data volume associated with the virtual machine 331, other virtual machines, and/or other applications. The network 340 may include an intra-datacenter network (i.e., between servers within the datacenter), inter-datacenter networks (i.e., between different datacenters), or other external networks (e.g., to clients on a local area network, wide area network, the Internet, etc.).

In some embodiments, the throttle module 334 may use the total allowable delay information received from the customer definition records 338 and the performance data received from the network 340 to determine a delay budget for the data payload (i.e., the outgoing data) received from the virtualized network connection 332. The delay budget may be determined based on the degree to which transmission of the data payload within the network 340 can be slowed or delayed while meeting the total allowable delay definition for data delivery from the origin datacenter to the destination datacenter. The throttle module 334 may then forward the data payload and the delay budget to the compression/deduplication module 336.

The compression/deduplication module 336 may then use the received delay budget to determine the extent to which the data payload may be compressed and/or deduplicated, while still meeting the delay budget. Accordingly, the compression/deduplication module 336 may then compress and/or deduplicate the data payload to provide a reduced data payload having a reduced data volume, which may then be transmitted to the network 340 for propagation. The reduced data payload may result in decreased resource demands (e.g., bandwidth) on the network 340 and possibly the entire datacenter due to the smaller data volume and lower loads and network congestion at the network core (e.g., the core servers 222 in FIG. 2), yet still meet the total allowable delay received from the customer definition records 338 and therefore provide a customer with the desired performance.

In some embodiments, the performance data received from the network 340 may include more than just network performance data. For example, there may be a balance between network congestion and the amount of processing that is desirable for the compression/deduplication by the compression/deduplication module 336, such that in some situations, the system may not compress/deduplicate data as much or at all if the core is not congested.

In some embodiments, the data compression/deduplication module 336 may be implemented as an infrastructure task that may be performed on a local machine (e.g., on one of the application servers 228 in FIG. 2) or on an edge server (e.g., one of the edge servers 226 in FIG. 2), or any other relatively local machine, at an origin datacenter or at a destination datacenter. Data movement within a rack may have a relatively small impact on the delay budget, on the order of 1 ms. Thus, the compression/deduplication module 336 may be implemented to use slack time on nearby processors in order to reduce the network burden on the network core.

Figure 4:
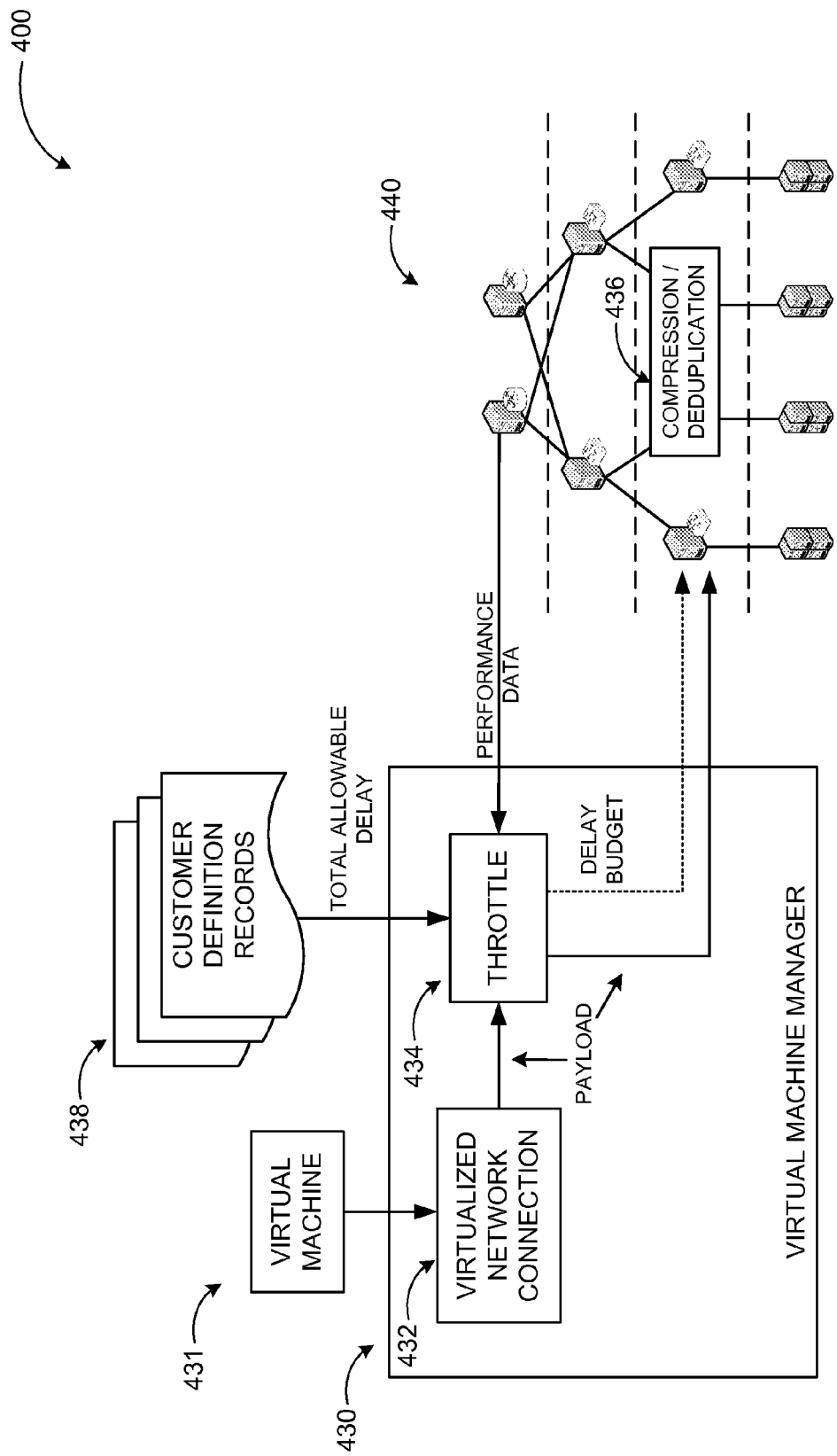
FIG. 4 illustrates a block diagram of another example system implementing servicing a client through excess network performance.

FIG. 4 illustrates a block diagram of another example system implementing servicing a client through excess network performance, arranged in accordance with at least some embodiments described herein.

As shown in a diagram 400, a virtual machine 431 (e.g., one of the virtual machines 104 described in FIG. 1) may transmit outgoing data through a virtual machine manager (VMM) 430. The VMM 430 may be similar to the VMM 330 described above in relation to FIG. 3, and may include a virtualized network connection 432 (similar to the virtualized network connection 332 in FIG. 3) and a throttle module 434 (similar to the throttle module 334 in FIG. 3).

However, in contrast to the VMM 330, the VMM 430 may not include a compression/deduplication module. Instead, data compression and/or deduplication may be performed by one or more compression/deduplication hardware modules 436 which may be located within a network 440 (similar to the network 340 in FIG. 3). For example, the network 440 may include one or more network processors that may provide hardware implementations or realizations of compression and/or deduplication (i.e., "appliances") or such functions may be aided by software defined networks (SDN) such as an OpenFlow network element. Dedicated hardware systems may be present in the network 440 in relatively large numbers and have high availability. In some embodiments, the hardware-based processors/appliances that implement the compression/deduplication may reside in the edge server layer (e.g., the edge servers 226 in FIG. 2) and/or the aggregate server layer (e.g., the aggregation servers 224 in FIG. 2) in a datacenter. While the throttle module 434 may operate in a similar fashion to the throttle module 334 in FIG. 3, the resulting delay budget and data payload may then be forwarded to the compression/deduplication hardware modules 436, which may then reduce the data payload via compression and/or deduplication accordingly. The throttle module function may also be moved to a network element.

In some embodiments, the network processors on which the compression/deduplication hardware realizations are implemented may be dedicated hardware configured to process packets in a datacenter by modifying headers, checking content, and/or forwarding packets and frames according to demand. The network processors may be configured at the hardware level for packet processing with some similarities to graphics processing units (GPUs) in that they may have very large parallel flows and specialized processing. In some embodiments, network processors may not include cache (since cache may not be useful for serial packet processing), may include hardware expression matching, and may include other optimizations for handling high packet traffic.

Figure 5:
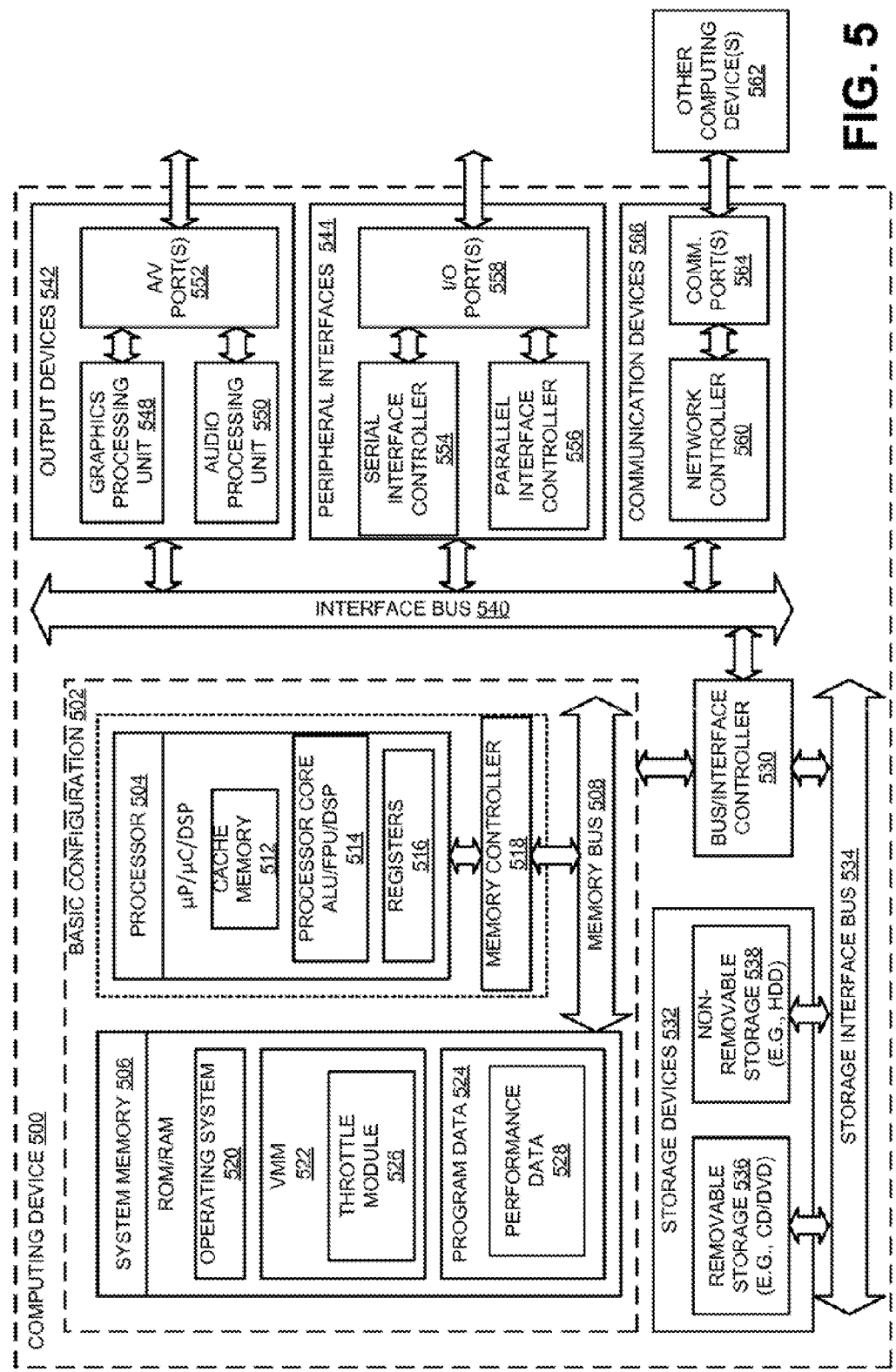
FIG. 5 illustrates a general purpose computing device, which may be used to implement cost reduction for servicing a client through excess network performance.

FIG. 5 illustrates a general purpose computing device 500, which may be used to implement cost reduction for servicing a client through excess network performance, arranged in accordance with at least some embodiments described herein. For example, the computing device 500 may be used to implement cost reduction for servicing a client through excess network performance as described herein. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a virtual machine manager (VMM) 522, and program data 524. The VMM 522 may include a throttle module 526 for implementing cost reduction for servicing a client through excess network performance as described herein. The program data 524 may include, among other data, performance data 528 or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for implementing cost reduction for servicing a client through excess network performance. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 6:
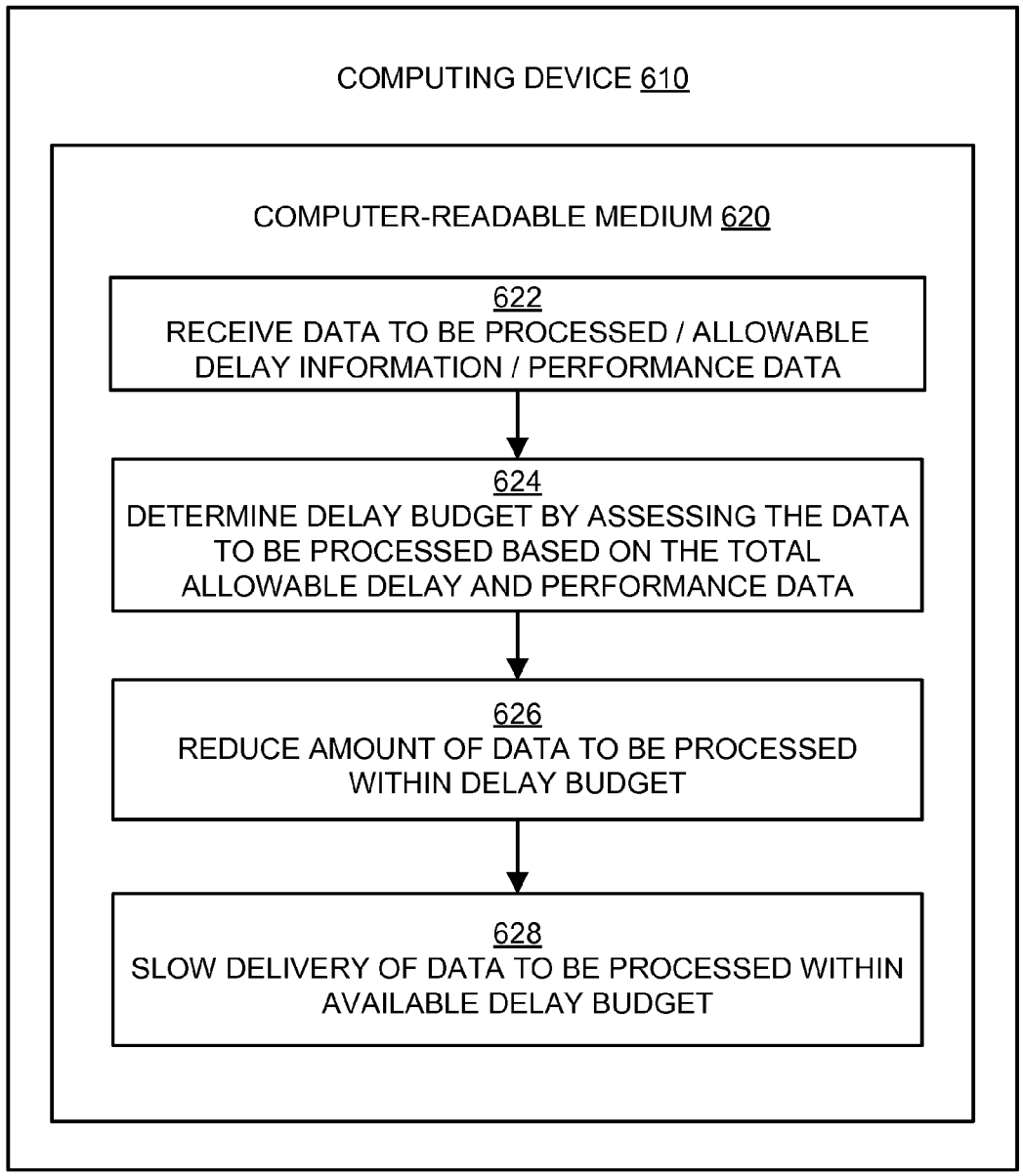
FIG. 6 is a flow diagram illustrating an example method that may be performed by a computing device such as the device in FIG. 5.

FIG. 6 is a flow diagram illustrating an example method for implementing cost reduction for servicing a client through excess network performance that may be performed by a computing device such as the computing device 500 in FIG. 5, arranged in accordance with at least some embodiments described herein. Example methods may include one or more operations, functions or actions as illustrated by one or more of blocks 622, 624, 626, and/or 628, and may in some embodiments be performed by a computing device such as the computing device 500 in FIG. 5. The operations described in the blocks 622-628 may also be stored as computer-executable instructions in a computer-readable medium such as a computer-readable medium 620 of a computing device 610.

An example process for implementing cost reduction for servicing a client through excess network performance may begin with block 622, "RECEIVE DATA TO BE PROCESSED/ALLOWABLE DELAY INFORMATION/PERFORMANCE DATA", where data that is to be replicated, allowable delay information, and/or performance data may be received by, for example, a throttle module (e.g., the throttle modules 334 and 434 in FIGS. 3 and 4, respectively). In some embodiments, the data to be replicated may be received from a virtual machine (e.g., the virtual machines 331 and 431 in FIGS. 3 and 4, respectively), the allowable delay information may be received from a customer definition record (e.g., the customer definition records 338 and 438 in FIGS. 3 and 4, respectively), and the performance data may be received from an intra-datacenter, inter-datacenter, or external network (e.g., the networks 340 and 440 in FIGS. 3 and 4, respectively).

Block 622 may be followed by block 624, "DETERMINE DELAY BUDGET BY ASSESSING THE DATA TO BE PROCESSED BASED ON THE TOTAL ALLOWABLE DELAY AND PERFORMANCE DATA", where a delay budget (e.g., how much the delivery of the data to be processed can be delayed/slowed) may be determined (e.g., by the throttle modules 334 and 434 in FIGS. 3 and 4, respectively) based on the data to be processed, the allowable delay information, and the performance data, as described above.

Block 624 may be followed by block 626, "REDUCE AMOUNT OF DATA TO BE PROCESSED WITHIN DELAY BUDGET", where the volume of the data to be processed may be reduced by, for example, deduplication and/or compression (e.g., performed by the compression/deduplication modules 336 and 436 in FIGS. 3 and 4, respectively) as described above, while remaining within the delay budget determined in block 924.

Finally, block 626 may be followed by block 628, "SLOW DELIVERY OF DATA TO BE PROCESSED WITHIN AVAILABLE DELAY BUDGET", where the deduplicated and/or compressed data to be processed is then delivered while remaining within the available delay budget.

Figure 7:
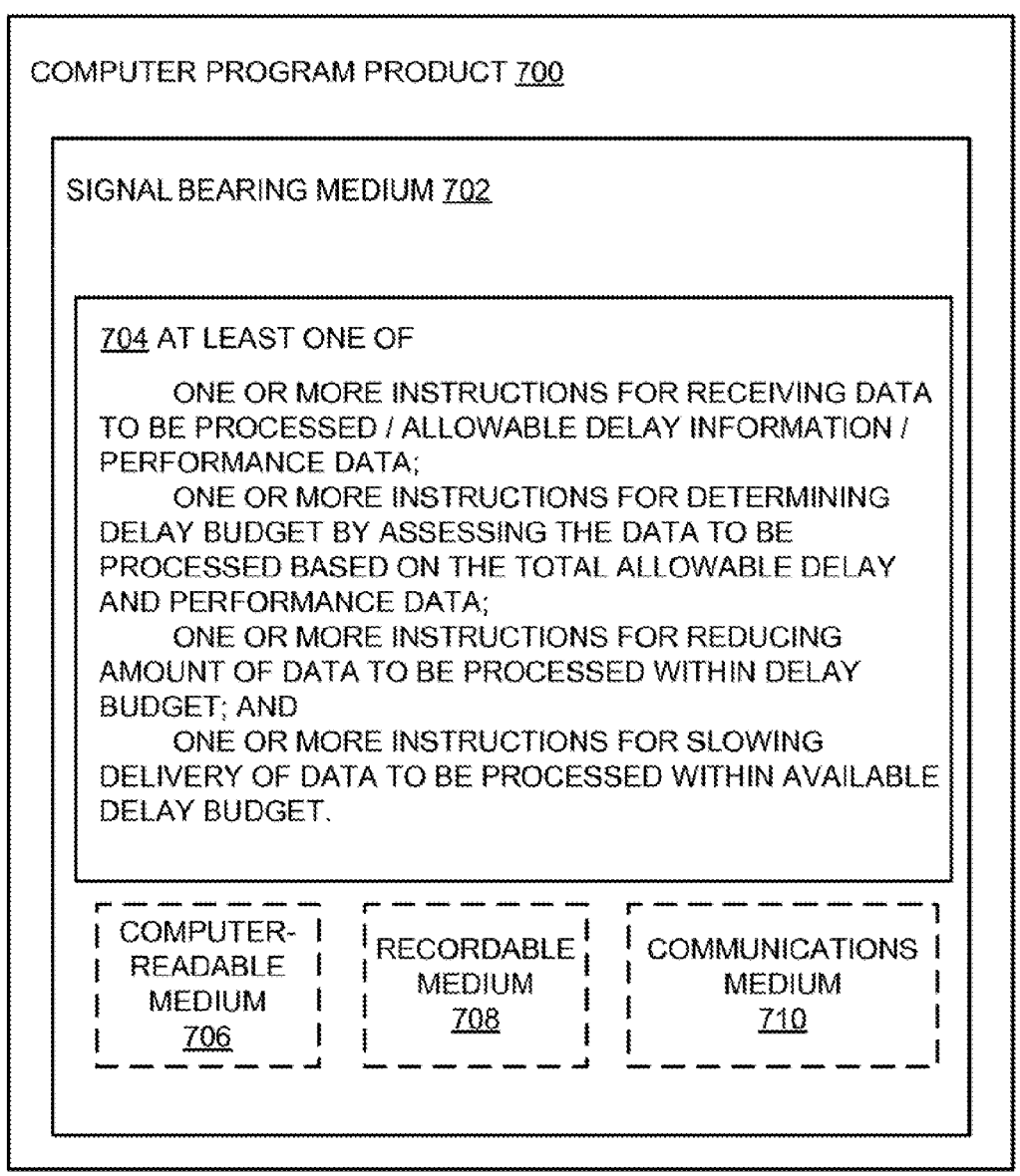
FIG. 7 illustrates a block diagram of an example computer program product; all arranged in accordance with at least some embodiments described herein.

FIG. 7 illustrates a block diagram of an example computer program product arranged in accordance with at least some embodiments described herein.

In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the VMM 522 may undertake one or more of the tasks shown in FIG. 7 in response to the instructions 704 conveyed to the processor 504 by the signal bearing medium 702 to perform actions associated with implementing cost reduction for servicing a client through excess network performance as described herein. Some of those instructions may include, for example, receiving data to be processed, receiving allowable delay information, receiving performance data, determining a delay budget by assessing the data to be processed based on the total allowable delay and performance data, reducing the amount of data to be processed within the delay budget, and/or slowing delivery of the data to be processed within the available delay budget, according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the computer program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard).

According to some example embodiments, a method for using excess network performance to reduce cost of servicing a client may include receiving a total allowable delay information associated with processing data at a datacenter based on a performance specification, determining a delay budget based on assessing the data to be processed based on the total allowable delay information, and performing a data reduction process on the data to be processed while slowing the processing of the data within the delay budget.

According to other examples, the method may further include one or more of performing the data reduction process during the processing of the data; receiving the data to be processed via a virtualized network connection; performing the data reduction process as a transportable infrastructure task at an edge layer or a local machine of a datacenter network; performing the data reduction process at one or more hardware based deduplication processors at an edge or an aggregation layer of a datacenter network; and/or performing the data reduction process at one or more hardware based compression processors at an edge or an aggregation layer of a datacenter network. The method may also include receiving performance information from a network of the datacenter and determining the delay budget also based on the performance information.

According to further examples, the data reduction process may include data deduplication by comparing the data to be processed to deduplication hashes and replacing a known portion of the data to be processed with links to one or more local data stores of the datacenter. The deduplication hashes may be within a storage system or across a cache of transmissions of the datacenter, and the method may include generating deduplication signatures of non-repetitive sections of the data to be processed. The method may further include receiving indications of matches between the deduplication signatures and the deduplication hashes; deduplicating data associated with the matching deduplication signatures; replicating data reduced by deduplication; and reconstructing the reduced data. The data reduction process may also include data compression such that data compression and decompression times are within the delay budget, and the method may include balancing between a network congestion and an amount of processing desirable for the data reduction process.

According to other example embodiments, a virtual machine manager (VMM) for using excess network performance to reduce cost of servicing a client may include a virtualized network connection configured to receive data to be processed from one or more virtual machines within the datacenter, a throttle module, and a data reduction module. The throttle module may be configured to receive a total allowable delay information associated with processing the data based on a performance specification and determine a delay budget based on assessing the data to be processed based on the total allowable delay information. The data reduction module may be configured to receive the data to be processed and the delay budget from the throttle module and reduce an amount of the data to be processed while slowing the processing of the data within the delay budget.

According to further examples, the data reduction module may perform the data reduction process during the processing of the data. The throttle module may receive performance information from a network of the datacenter and determine the delay budget also based on the performance information. The data reduction module may be implemented as a transportable infrastructure task at an edge layer or a local machine of a datacenter network. The data reduction module may also be implemented at one or more hardware based deduplication processors at an edge or an aggregation layer of a datacenter network or at one or more hardware based deduplication processors at an edge or an aggregation layer of a datacenter network.

According to some examples, the data reduction module may further deduplicate the data to be processed by comparing the data to be processed to deduplication hashes and replacing a known portion of the data to be processed with links to one or more local data stores of the datacenter. The deduplication hashes may be within a storage system or across a cache of transmissions of the datacenter. The data reduction module may also generate deduplication signatures of non-repetitive sections of the data to be processed.

According to yet other examples, the data reduction module may receive indications of matches between the deduplication signatures and the duplications hashes and deduplicate data associated with the matching deduplication signatures. The throttle module may process data reduced by deduplication and enable reconstruction of the reduced data. The data reduction module may compress the data to be processed such that data compression and decompression times are within the delay budget. The throttle module may balance between a network congestion and an amount of processing desirable for the data reduction process and adjust an amount of data reduction based on one or more current network conditions to maintain a minimum specified performance for each application associated with the data to be processed. The throttle module may be implemented in the datacenter or a third party management entity. The data reduction module may further reduce the amount of the data to be processed by performing data compression such that data compression and decompression times are within the delay budget.

According to further example embodiments, a computer-readable storage medium may have instructions stored thereon for using excess network performance to reduce cost of servicing a client. The instructions may include receiving a total allowable delay information associated with processing data at a datacenter based on a performance specification, determining a delay budget based on assessing the data to be processed based on the total allowable delay information, and performing a data reduction process on the data to be processed while slowing the processing of the data within the delay budget.

According to other examples, the instructions may further include one or more of performing the data reduction process during the processing of the data; receiving the data to be processed via a virtualized network connection; performing the data reduction process as a transportable infrastructure task at an edge layer or a local machine of a datacenter network; performing the data reduction process at one or more hardware based deduplication processors at an edge or an aggregation layer of a datacenter network; and/or performing the data reduction process at one or more hardware based compression processors at an edge or an aggregation layer of a datacenter network. The instructions may also include receiving performance information from a network of the datacenter and determining the delay budget also based on the performance information.

According to some examples, the data reduction process may include data deduplication by comparing the data to be processed to deduplication hashes and replacing a known portion of the data to be processed with links to one or more local data stores of the datacenter. The deduplication hashes may be within a storage system or across a cache of transmissions of the datacenter, and the instructions may include generating deduplication signatures of non-repetitive sections of the data to be processed. The instructions may further include receiving indications of matches between the deduplication signatures and the deduplication hashes; deduplicating data associated with the matching deduplication signatures; replicating data reduced by deduplication; and reconstructing the reduced data. The data reduction process may also include data compression such that data compression and decompression times are within the delay budget, and the instructions may include balancing between a network congestion and an amount of processing desirable for the data reduction process.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to use excess network performance to reduce cost of servicing a client, the method comprising:
   receiving a migrated deployment at a datacenter; and
   in response to a determination that the datacenter is capable of providing a network performance that exceeds a defined minimum level of performance necessary for the migrated deployment, using the excess network performance to decrease resource demands in one or more layers of the datacenter by:
      receiving a total allowable delay information associated with data of the migrated deployment to be processed at the datacenter based on a performance specification, wherein the performance specification includes the defined minimum level of performance necessary for the migrated deployment;
      determining a delay budget by assessing the data to be processed based on the total allowable delay information; and
      decreasing the resource demands on the one or more layers of the datacenter while enabling the total allowable delay information to be met such that a customer is provided with a desired performance by performing one or more of data deduplication and data compression on the data to be processed while slowing the processing of the data within the delay budget to lower data volume in the datacenter, wherein the one or more of data deduplication and data compression comprises:
      generating deduplication signatures of non-repetitive sections of the data;
      comparing the deduplication signatures of the non-repetitive sections of the data to deduplication hashes to determine matches between the deduplication signatures and the deduplication hashes;
      deduplicating data associated with the matching deduplication signatures by replacing a known portion of the data with links to one or more local data stores of the datacenter;
      replicating data reduced by deduplication; and
      reconstructing the reduced data.

2. The method according to claim 1, further comprising:
performing the one or more of data deduplication and data compression during the processing of the data.

3. The method according to claim 1, further comprising:
receiving performance information from a network of the datacenter; and
determining the delay budget also based on the performance information.

4. The method according to claim 1, further comprising:
receiving the data to be processed via a virtualized network connection.

5. The method according, to claim 1, further comprising:
performing the one or more of data deduplication and data compression as a transportable infrastructure task at one of an edge layer and a local machine of a datacenter network.

6. The method according to claim 1, further comprising:
performing the one or more of data deduplication and data compression at one or more hardware based deduplication processors at one of an edge or an aggregation layer of a datacenter network.

7. The method according to claim 1, further comprising:
performing the one or more of data deduplication and data compression at one or more hardware based compression processors at one of an edge or an aggregation layer of a datacenter network.

8. A virtual machine manager (VMM) to use excess network performance to reduce cost of servicing a client, the VMM comprising:
   a virtualized network connection configured to receive data of a migrated deployment to be processed from one or more virtual machines within a datacenter;
   a throttle module configured to:
      determine whether a network performance of the datacenter exceeds a defined minimum level of performance necessary for the migrated deployment by:
         receiving a total allowable delay information associated with processing the data based on a performance specification, wherein the performance specification includes the defined minimum level of performance necessary for the migrated deployment; and
         determining a delay budget by assessing the data to be processed based on the total allowable delay information; and
   a data reduction module, implemented as a transportable infrastructure task at one of an edge layer and a local machine of a datacenter network, configured to:
      receive the data to be processed and the delay budget from the throttle module; and
      in response to a determination that the network performance of the datacenter exceeds the defined minimum level of performance necessary for the migrated deployment, use the excess network performance to decrease resource demands in one or more layers of the datacenter while enabling the total allowable delay information to be net such that a customer is provided, with a desired performance by performing one or more of data deduplication and data compression to reduce an amount of the data to be processed while slowing the processing of the data within the delay budget, wherein the one or more of data deduplication and data compression comprises:
  generating deduplication signatures of non-repetitive sections of the data;
  comparing the deduplication signatures of the non-repetitive sections of the data to deduplication hashes to determine matches between the deduplication signatures and the deduplication hashes;
  deduplicating data associated with the matching deduplication signatures by replacing a known portion of the data with links to one or more local data stores of the datacenter;
  replicating data reduced by deduplication; and
  reconstructing the reduced data.

9. The VMM according to claim 8, wherein, the deduplication hashes are within one of a storage system or across a cache of transmissions of the datacenter.

10. The VMM according to claim 8, wherein the throttle module is further configured to
  balance between a network congestion and an amount of processing desirable for the data reduction.

11. The VMM according to claim 8, wherein the throttle module is further configured to:
  adjust an amount of data reduction based on one or more current network conditions to maintain a minimum specified performance for each application associated with the data to be processed.

12. The VMM according to claim 8, wherein the throttle module is implemented in one of the datacenter or a third party management entity.

13. The VMM according to claim 8, wherein the data reduction module is further configured to:
  reduce the amount of the data to be processed through data compression such that data compression and decompression times are within the delay budget.

14. A computer-readable storage medium having instructions stored thereon to use excess network performance to reduce cost of servicing a client, the instructions comprising:
  receiving a migrated deployment at a datacenter; and
  in response to a determination that the datacenter is capable of providing a network performance that exceeds a defined minimum level of performance necessary for the migrated deployment, using the excess network performance to decrease resource demands in one or more layers of the datacenter by:
    receiving a total allowable delay information associated with data of the migrated deployment to be processed at the datacenter based on a performance specification, wherein the performance specification includes the defined minimum level of performance necessary for the migrated deployment;
    determining a delay budget by assessing the data to be processed based on the total allowable delay information; and
    decreasing the resource demands in the one or more layers of the datacenter while enabling the total allowable delay information to be met such that a customer is provided with a desired performance by performing one or more of data deduplication and data compression on the data to be processed while slowing the processing, of the data within the delay budget to lower data volume in the datacenter, wherein the one or more of data deduplication and data compression is a transportable infrastructure task at one of an edge layer and a local machine of a datacenter network, and wherein the one or more of data deduplication and data compression comprises:
      generating deduplication signatures of non-repetitive sections of the data;
      comparing the deduplication signatures of the non-repetitive sections of the data to deduplication hashes to determine matches between the deduplication signatures and the deduplication hashes;
      deduplicating data associated with the matching deduplication signatures by replacing a known portion of the data with links to one or more local data stores of the datacenter;
      replicating data reduced by deduplication; and
      reconstructing the reduced data.

15. The computer-readable storage medium according to claim 14, wherein the instructions further comprise:
  performing the one or more of data deduplication and data compression during the processing of the data.

16. The computer-readable storage medium according to claim 14, wherein the instructions further comprise:
  receiving performance information from a network of the datacenter; and
  determining the delay budget also based on the performance information.

17. The computer-readable storage medium according to claim 14, wherein the deduplication hashes are within one of a storage system, or across a cache of transmissions of the datacenter.

* * * * *